US012566058B2

(12) United States Patent (10) Patent No.: US 12,566,058 B2
Goodwin et al. (45) Date of Patent: Mar. 3, 2026

(54) COMPACT SHEAROGRAPHY SYSTEM WITH ADJUSTABLE SHEAR DISTANCE

(71) Applicant: Nikon Corporation, Tokyo (JP)

(72) Inventors: Eric Peter Goodwin, Oro Valley, AZ (US); Daniel Gene Smith, Tucson, AZ (US)

(73) Assignee: Nikon Corporation, Tokyo (JP)

( * ) Notice: Subject to any disclaimer, the term of this patent is extended or adjusted under 35 U.S.C. 154(b) by 153 days.

(21) Appl. No.: 18/183,855

(22) Filed: Mar. 14, 2023

(65) Prior Publication Data

US 2023/0296368 A1 Sep. 21, 2023

Related U.S. Application Data

(60) Provisional application No. 63/269,459, filed on Mar. 16, 2022.

(51) Int. Cl.
| | |
|---|---|
| *G01B 9/02098* | (2022.01) |
| *G01B 9/02* | (2022.01) |
| *G01B 9/02015* | (2022.01) |
| *G01B 11/16* | (2006.01) |
| *G01B 11/24* | (2006.01) |

(52) U.S. Cl.
CPC ....... *G01B 9/02098* (2013.01); *G01B 9/0203* (2013.01); *G01B 9/02087* (2013.01); *G01B 9/02089* (2013.01); *G01B 9/02095* (2013.01); *G01B 11/162* (2013.01); *G01B 11/2441* (2013.01); *G01B 2290/70* (2013.01)

(58) Field of Classification Search
CPC .............. G01B 9/02098; G01B 9/0203; G01B 9/02087; G01B 9/02089; G01B 9/02095; G01B 11/162; G01B 2290/70; G01B 11/2441
See application file for complete search history.

(56) References Cited

U.S. PATENT DOCUMENTS

| | | | | |
|---|---|---|---|---|
| 2010/0128283 A1* | 5/2010 | Liesener | .............. | G01B 9/0209 |
| | | | | 359/370 |
| 2010/0233636 A1* | 9/2010 | Kuramoto | ............... | G03F 7/706 |
| | | | | 356/521 |

(Continued)

FOREIGN PATENT DOCUMENTS

| | | | | | |
|---|---|---|---|---|---|
| CN | 110319769 B | * | 4/2021 | ........ | G01B 9/02027 |
| DE | 102021200133 A1 | * | 8/2021 | | |

OTHER PUBLICATIONS

Saito et al., "Wide field snapshot imaging polarimeter using modified Savart plates," Proc. of SPIE 8873, Polarization Science and Remote Sensing VI, 88730M, (Sep. 2013).

(Continued)

*Primary Examiner* — Georgia Y Epps
*Assistant Examiner* — Erin R Garber
(74) *Attorney, Agent, or Firm* — Klarquist Sparkman, LLP

(57) ABSTRACT

Shearography systems provide independent setting of fringe frequency and shear magnitude by situating an interferometer with a tiltable reflector proximate a pupil plane of an imaging optical system. Fringe frequency can be selected based on a modified Savart plate. In other examples, a Wollaston prism or a polarization grating is translated with respect to an image sensor to vary shear magnitude while maintaining a substantially fixed fringe frequency.

26 Claims, 11 Drawing Sheets

(56) References Cited

U.S. PATENT DOCUMENTS

| | | | | |
|---|---|---|---|---|
| 2010/0271475 A1* | 10/2010 | Schwiegerling | ....... | G03B 15/00 |
| | | | | 348/135 |
| 2017/0350690 A1* | 12/2017 | Hatahori | ............. | G01M 5/0091 |
| 2020/0096326 A1* | 3/2020 | Goodwin | ............ | G03F 7/70075 |
| 2021/0102892 A1* | 4/2021 | Oron | .................. | G01B 9/02029 |
| 2022/0065617 A1* | 3/2022 | Goodwin | ............. | G01B 11/162 |
| 2023/0035415 A1* | 2/2023 | Kamenev | .......... | G01B 11/0675 |

OTHER PUBLICATIONS

Sanchez et al., "Analysis of a shearography device using a Wollaston prism and polarization phase shifting," Proc. of SPIE 9960, Interferometry XVIII, 99605 (Aug. 2016).

Debrus, "Speckle shearing interferometer using a Savart plate," Opt. Comm., vol. 20, pp. 257-261 (Feb. 1977).

* cited by examiner

SELECT FIXED FRINGE
FREQUENCY
102

VARY SHEAR
MAGNITUDE
104

PROCESS FRINGES
2D-FFT
FILTERING
INVERSE 2D-FFT
106

DISPLAY FRINGES/
TEST OBJECT
DEFORMATIONS
108

100

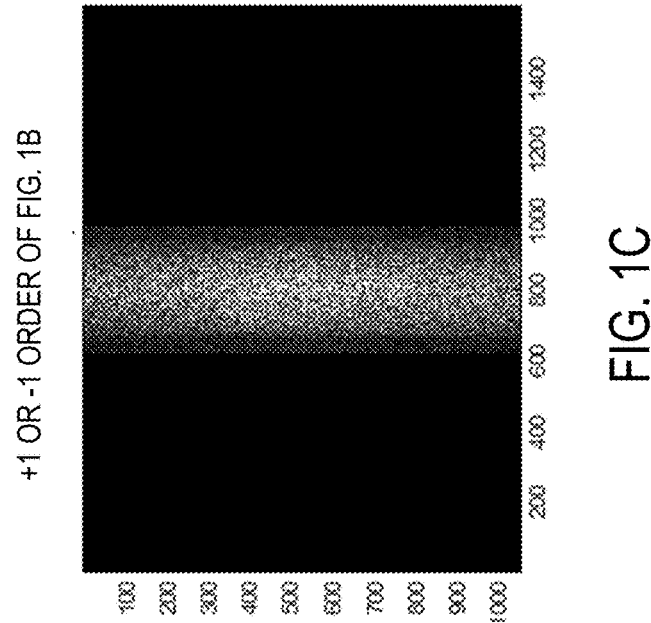
FIG. 1C
+1 OR -1 ORDER OF FIG. 1B
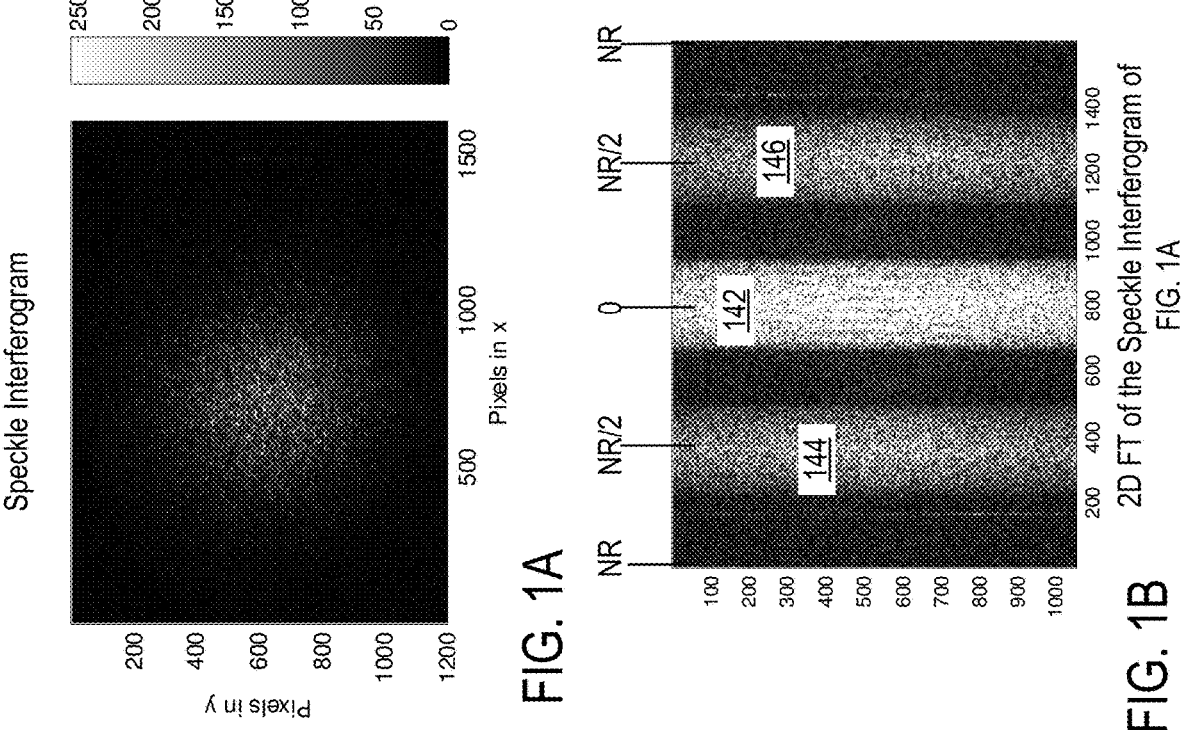
FIG. 1A
Speckle Interferogram
Pixels in x
Pixels in y
FIG. 1B
2D FT of the Speckle Interferogram of FIG. 1A

OBJECT
UNDER
TEST

304

330

333

302

305

346

308

311

321

320

310

332

309

348

333
Shear Distance
Adjustment
(Variable)

Carrier Frequency
Selection (Fixed)

Y

Z   X

300

COMPACT SHEAROGRAPHY SYSTEM WITH ADJUSTABLE SHEAR DISTANCE

CROSS-REFERENCE TO RELATED APPLICATIONS

This application claims the benefit of U.S. Provisional Application 63/269,459, filed Mar. 16, 2022, which is incorporated herein by reference.

FIELD

The disclosure pertains to metrology systems based on shearography.

BACKGROUND

Shearography systems provide data on surface shape changes based on speckle and use a double or sheared image of an object under test. In a conventional approach, a Michelson interferometer is situated near an image plane of a shearography optical system, and two copies of a speckle field are created, and a shear introduced at a particular carrier frequency. Unfortunately, conventional systems are not readily adaptable to testing parts having different kinds of surface variations and alternative approaches are desired.

SUMMARY

Disclosed herein are shearography systems, apparatus, and methods that permit adjustment of shear while keeping a fringe frequency substantially constant. In one example, an interferometer placed at or near a pupil plane of an imaging optical system is used to vary shear. Placement at or near the pupil plane substantially reduces or eliminates changes in fringe frequency. In other examples, a Wollaston prism or a polarization grating (PG) are configured to be translated with respect to a fringe sensor to adjust shear while angular deviations produced by the Wollaston or diffraction angles of the PG determine fringe frequency. Using the disclosed approaches, a shearography system can have a shear based on an intended application while leaving the fringe frequency substantially unchanged.

The foregoing and other features, and advantages of the disclosed technology will become more apparent from the following detailed description, which proceeds with reference to the accompanying figures.

BRIEF DESCRIPTION OF THE DRAWINGS

FIG. 1A illustrates a representative speckle interferogram.

FIG. 1B illustrates a two-dimensional Fourier transform of the speckle interferogram of FIG. 1A.

FIG. 1C illustrates filtering of the two-dimensional Fourier transformed speckle interferogram of FIG. 1B to remove a 0-order and a −1-order or a +1-order.

DETAILED DESCRIPTION

Figure 1:
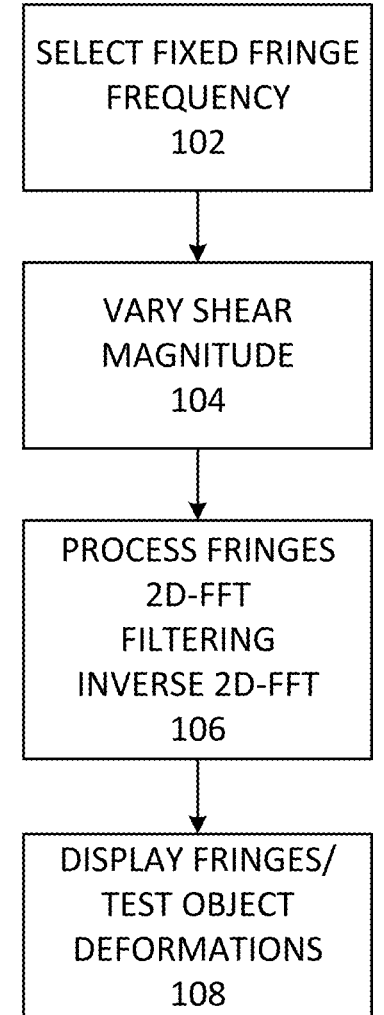
FIG. 1 is a block diagram of a representative shearography method that permits variation of shear magnitude with a predetermined (fixed) fringe frequency that exhibits little to no variation as shear magnitude varies.

Disclosed herein are shearography systems and methods that permit shear magnitude to be selected without appreciable variation in fringe carrier frequency, referred to herein as fringe frequency. In these approaches, shear distances can be varied up to 100 μm, 250 μm, 500 μm, 1 mm, or more with fringe carrier frequency changes of less than 20%, 10%, 5%, 2%, 1%, or less. In these approaches, carrier frequency is referred to as fixed or substantially fixed and adjustment of shear magnitude is referred to as independent or substantially independent of fringe carrier frequency.

As used herein, SOP refers to state of polarization. While linear or circular SOPs are used in some examples, other SOPs can be used. Typically, orthogonal states of polarization are used, but non-orthogonal polarizations can be used so long as at least a portion is orthogonal. In the examples, optical beams propagate along axes which can be straight lines but also can be bent or folded by mirrors, prisms, or other components. Lenses are typically illustrated as single lens elements (singlets) but multi-element lenses such as doublets, triplets, or other can be used. The examples are illustrated based primarily on transmissive optical elements, but reflective elements can be generally used instead.

Shear fringe patterns can form images for visual display or for storage in storage device such a memory. Alternatively, fringe patterns can be processed to provide a map of displacement of a test object. Displacements can be used as to provide a displayed image or stored in a memory.

A Savart plate is a polarization dependent optic that includes two birefringent plates typically made of the same material and having equal thickness. The plates are oriented so that their respective optic axes are at 45° to surface normals and are secured so that the respective optical axes are rotated by 90° with respect to each other. An extraordinary ray (e-ray) entering the first plate is displaced parallel to an ordinary ray (o-ray) On entering the second plate, the o-ray in the first plate becomes an e-ray in the second plate and is displaced while the e-ray in the first plate becomes an o-ray. As used herein, a modified Savart plate (MSP) is a Savart plate with a half-wave plate situated between the first and second birefringent plates and oriented to interchange o-ray and e-ray states of polarization. As further used herein, an integrated MSP is an MSP in which the first plate, the second plate, and the halfwave plate are secured to each other with an optical adhesive. A symmetric MSP is an MSP in which the first plate and the second plate have a common thickness and are made of the same material.

Beam and optical beam are used herein to referring to propagating electromagnetic radiation, typically at wavelengths between 200 nm and 2 pm but wavelengths between 400 nm and 700 nm are often convenient. Image such as speckle image refers to a visual display for observation by a user or a stored or storable representation that can be used to provide such a visual display. Typical storage formats include TIFF, BMP, and JPEG files.

Example 1

Referring to FIG. 1, a representative method 100 includes selecting a fixed fringe frequency at 102 and varying a shear magnitude at 104. At 106, fringes are acquired and processed and at 108, fringes or test object displacements are stored and/or displayed. Representative shearography systems that permit substantially fixed fringe frequency and variable shear magnitude are disclosed below.

FIGS. 1A-1B illustrate a representative speckle interferogram and its two-dimensional Fourier transform, respectively. FIG. 1A is a two-dimensional image with camera situated so that the speckle interferogram is approximately centered on the camera sensor. In this example, the camera sensor is a 1200 by 1500-pixel image sensor. The speckle interferogram can be stored in memory and Fourier transformed to produce the Fourier transformed interferogram shown in FIG. 1B having a full spectral width along the horizontal axis of twice the Nyquist rate (NR). It is preferable that the +1-order and −1-orders 144, 146, respectively of the Fourier transformed interferogram are situated a distance NR/2 from a 0-order 142. This arrangement tends to avoid wraparounds at the extremes of the Fourier transformed interferogram and provides ample separation of the +1 and −1 orders 144, 146 from the 0-order 142. FIG. 1C illustrates filtering of the Fourier transformed interferogram to remove the 0-order and one of either the +1-order or the −1-order. This filtered, Fourier transformed interferogram can be inverse transformed to produce a relative phase map; additional such phase maps obtained from corresponding speckle interferograms can be used to form phase difference maps associated with target motion such as vibration. It is advantageous to configure acquisition of speckle interferograms so that the +1, −1, and 0-orders are as shown in FIG. 1B. In conventional shearography, fringe frequencies vary with shear magnitude and it is necessary to reconfigure speckle interferogram acquisition systems upon changing shear magnitude for a particular application in order to maintain suitable separations of the orders in the Fourier transform. By contrast, in the disclosed approaches, such reconfiguration is unnecessary as shear magnitude and shear fringe frequency are independent or substantially so. Thus, once speckle interferogram acquisition is configured so that the Fourier transform is as shown in FIG. 1B, shear magnitude can be adjusted as needed for any application without changing the frequencies of the +1 and −1 orders.

Example 2

Figure 2:
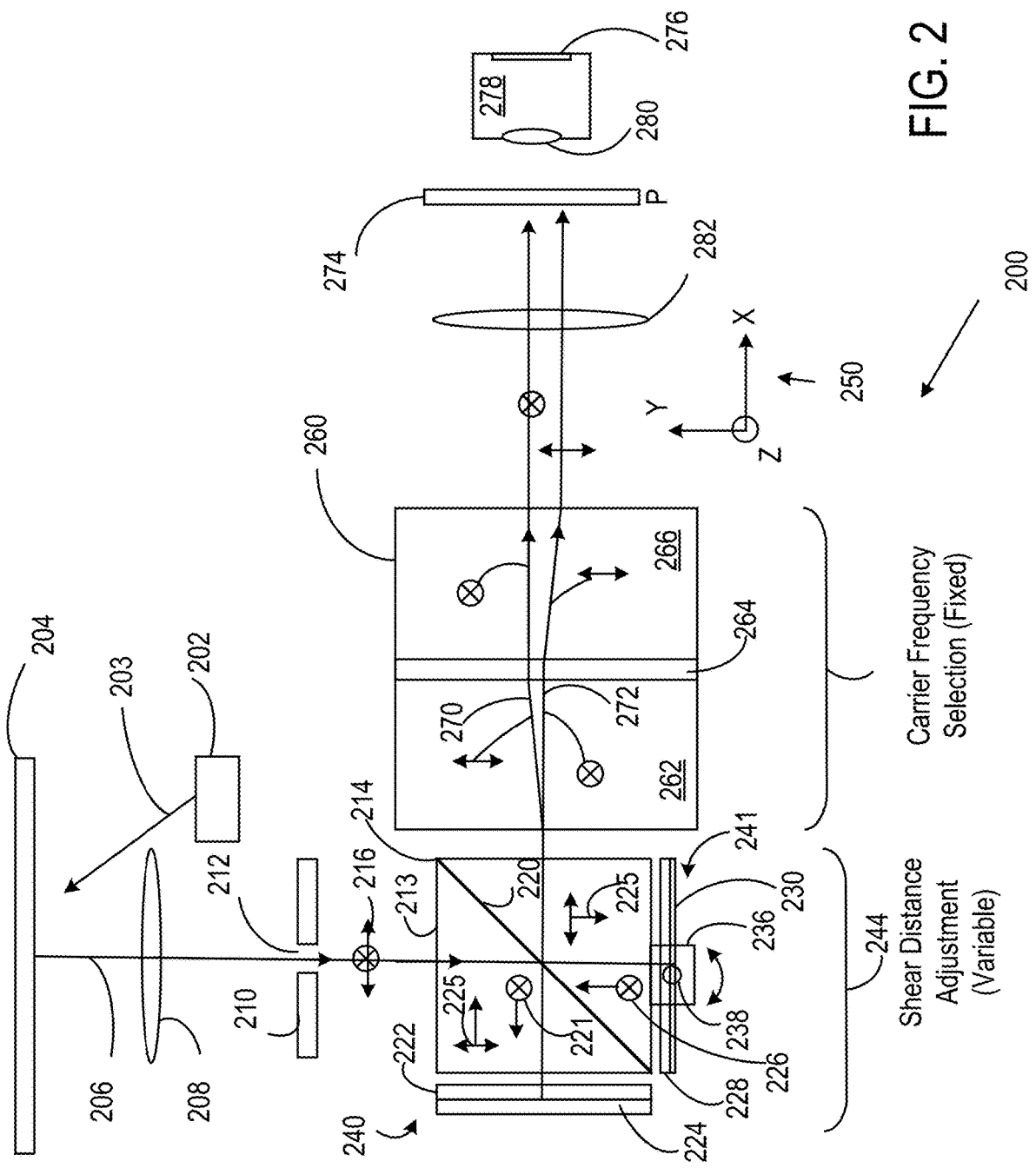
FIG. 2 illustrates a representative shearography system having a fixed fringe frequency and a variable shear magnitude.

Referring to FIG. 2, a representative shearography system 200 includes a laser 202 that delivers an optical beam 203 to a test part 204. The optical beam 203 has polarization components in an xy-plane and parallel to a Z-axis with respect to a coordinate system 250. A beam portion 206 of the optical beam 203 that is scattered or reflected from the test part 204 is received by a lens 208 and delivered to an aperture plate 210 that defines an elongated aperture 212 that has a larger extent in a Z-direction than in an X-direction in the coordinate system 250. The aperture plate 210 is generally situated at an input surface 213 of a polarizing beam splitter (PBS) 214 or defined on the input surface 213. Alternatively, the aperture plate 210 can be situated proximate, at, or on an exit surface of the PBS 214. The aperture 212 can be a slit aperture and serves to limit the spatial extent of the speckle in the direction of shear. The beam portion 206 is then directed to the PBS 214 in a state of polarization (SOP) 216 that includes components parallel to both the X and Z-axes of the coordinate system 250. A polarizing reflective surface 220 of the PBS 214 produces a first polarized beam by reflecting a Z-polarized component (an s-polarization) 221 to a quarter-wave retarder 222 and a reflector 224. The quarter-wave retarder 222 is oriented to produce a circular SOP at the reflector 224 so upon reflection by the reflector 224 through the quarter-wave retarder 222, the first polarized beam is Y-polarized as shown at 225 and is transmitted as a p-polarization at the polarizing reflective surface 220.

The polarizing reflective surface 220 produces a second polarized beam by transmitting an X-polarized component (a p-polarization) 225 to a quarter-wave retarder 228 and a reflector 230. The quarter-wave retarder 228 is oriented to produce a circular SOP at the reflector 230 so upon reflection by the reflector 230 through the quarter-wave retarder 222, the second polarized beam is Z-polarized as shown at 226 and is reflected as an s-polarization at the polarizing reflective surface 220. In this example, a tilt mechanism 236 is coupled to the reflector 230 to produce a rotation about an axis 238 but a tilt mechanism can also be coupled to the reflector 224 in addition to or instead of the reflector 236. In some cases, the quarter-wave retarder 228 and the reflector 230 are secured to each other and both are tilted. A quarter-wave retarder combined with a reflector can be referred to as a quarter-wave mirror for convenience so that reflectors 224, 230 and quarter-wave retarders 222, 228 can form respective quarter-wave mirrors 240, 241.

The quarter-wave mirrors 240, 241 and the PBS 214 form a Michelson interferometer 244 which can be situated proximate a stop defined by the aperture 212. The Michelson interferometer 244 is arranged to divide an input optical beam evenly, but other divisions of beam power can be used. Rotation of the quarter-wave reflector 241 (or the reflector 230) changes the beam angle of the associated beam portion in a pupil of the optical system, changing the beam's position at the image, i.e., this tilt varies shear distance. By adjustment with the tilt mechanism 236, shear distance can be selected. Typically, the tilt is not provided exactly at a pupil location, some (small) changes in carrier frequency can be produced. Placing the aperture 212 close to the PBS 214 tends to reduce the dependence of fringe carrier frequency on shear magnitude.

The two orthogonally polarized beams 270, 272 from the PBS 214 are directed to a modified Savart Plate (MSP) 260 that establishes fringe carrier frequency. The MSP 260 includes a first birefringent plate 262 with a crystal axis oriented so that the birefringent plate 262 shifts the first beam 270 (associated with reflection from the reflector 224) in a +y-direction. A halfwave plate (HWP) 264 exchanges SOPs of the beams 270, 272. A second birefringent plate 266 is oriented to shift the second beam 272 (associated with reflection from the reflector 230) in a −Y-direction. Crystal axes of the birefringent plates 262, 264 are typically orthogonal but other arrangements can be used. As shown in the example of FIG. 2, Y-axis shifts of the first beam 270 and the second beam 272 are equal and opposite. The first beam 270 and the second beam 272 are directed from the MSP 260 to a downstream polarizer 274 having a polarization axis at 45 degrees with respect to the beam SOPs so that interference can be produced at an image sensor 276. The polarizer 274 can be situated anywhere between the image sensor 276 and the MSP 260 and can be oriented so that polarization components from the first beam 272 and the second beam 274 are equally projected onto a polarizer axis. The image sensor 276 is illustrated as a component of a camera 278 that includes a lens 280. An external lens 282 is also provided. Total beam separation, focal length of associated optics such as lenses 280, 282, and pixel pitch of the image sensor 276 are used to determine the carrier frequency. The thickness of the MSP 260 is fixed so that the carrier frequency is fixed and is preferably selected to about half of a Nyquist frequency The polarizer 274 is needed to project both beams to the same polarization state such that they interfere at the detector. Linear SOPs and polarizers are convenient, but other SOPs can be used.

Typically, the MSP 260 introduces some amount of shear that can be compensated using tilt of one of the reflectors 224, 230 in the Michelson interferometer. The amount of shear introduced depends on the optical design.

Example 3

Figure 3:
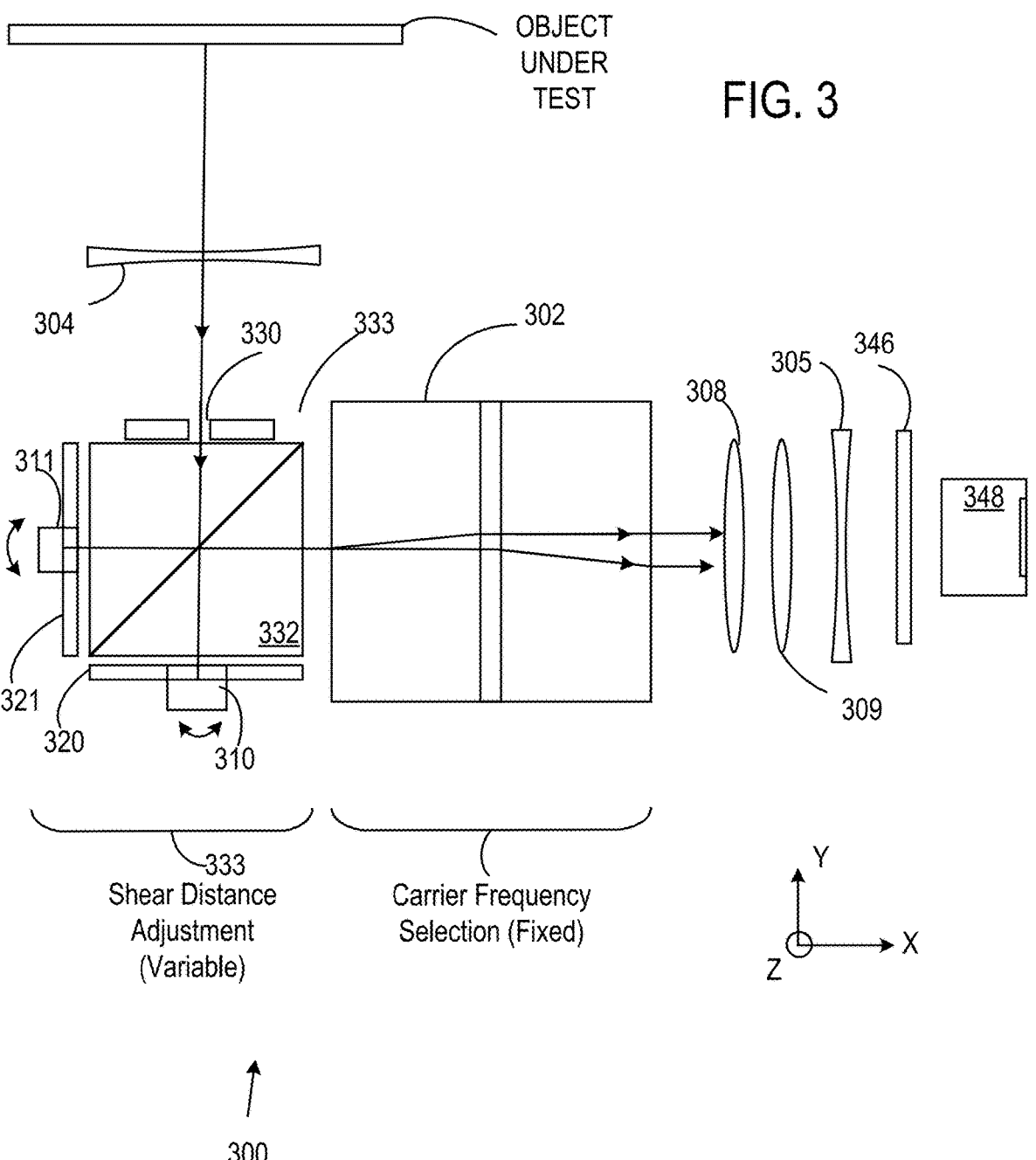
FIG. 3 illustrates a representative implementation of a system such as illustrated in FIG. 2.

A particular implementation of a system such as illustrated in FIG. 2 is shown in FIG. 3. The system 300 includes an MSP 302 having 27 mm thick calcite crystals, negative lenses 304, 305 having focal lengths of −75 mm, and positive lenses 308, 309 having focal lengths of +75 mm. The lenses 304, 305, 308, 309 are shown as single element lenses, but in an example, doublets are used. An illumination wavelength can be 532 nm and rotational stages 310, 311 can be provided for respective quarter-wave mirrors 320, 321 that form part of an interferometer 333. A slit aperture 330 is situated at a PBS 332 and a polarizer 346 is situated between the lens 305 and a camera 348. This arrangement is a representative example and dimensions, focal lengths, and other parameters can be varied as may be preferred. In this example, the negative lens 304 reduces the range of angles received by the interferometer 333 and the MSP 302. This also changes the amount of shear introduced by the MSP 302, but this can be compensated using the tilt of one or both of the mirrors 320, 321.

Example 4

Figure 4A:
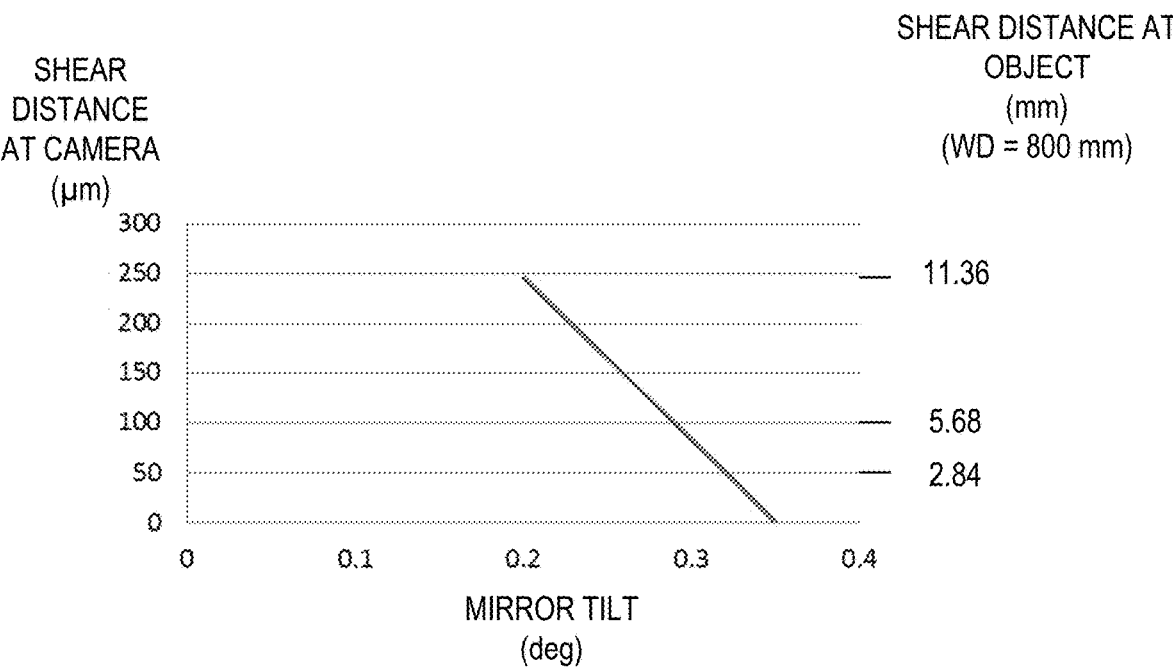
FIG. 4A illustrates shear as a function of mirror tilt for systems such as illustrated in FIGS. 2-3.
Figure 4B:
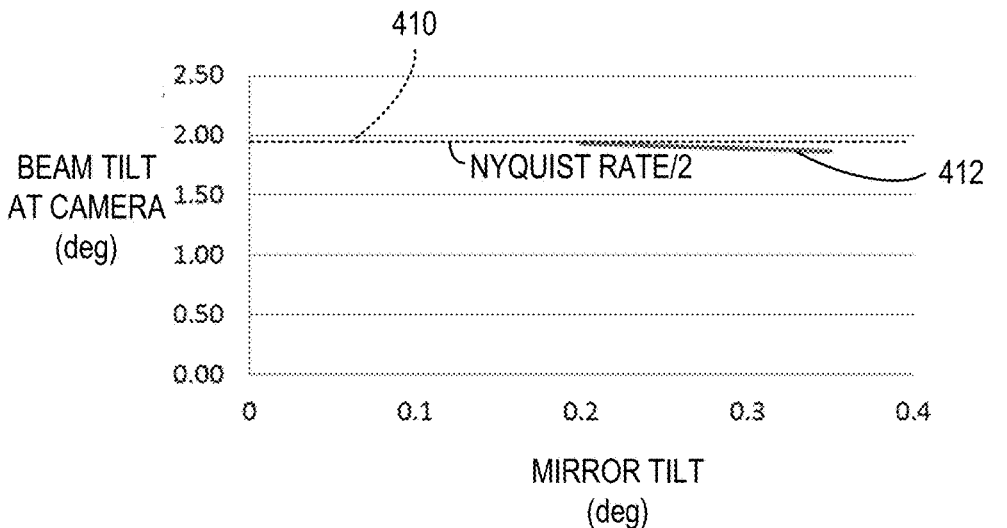
FIG. 4B illustrates that beam tilt (corresponding to fringe frequency) remains substantially constant as a function of mirror tilt in systems such as shown in FIGS. 2-3.

FIGS. 4A-4B are graphs of shear distance and beam tilt at the camera 348 as a function of tilt angle of either of the quarter-wave mirrors 320, 321. Beam tilt at the camera 348 corresponds to and is proportional to carrier frequency. FIG. 4A shows that shear distance can be tuned to zero or non-zero values. Setting shear distance to zero permits alignment without removing the MSP 302 and allows establishing minimal shear distances such as about 1 mm on the object when the object is located 800 mm away from the first lens element (the lens 304) of the shearography system 300. FIG. 4B shows beam tilt angle as a function of the same mirror tilts of FIG. 4A. FIG. 4B includes a line 410 corresponding to beam tilt associated with carrier frequency at one-half the Nyquist frequency at the camera 348 and a curve 412 illustrates measured tilt in the same range of mirror tilts. As illustrated, variation in beam tilt angle is small and thus fringe carrier frequency variation as a function of mirror tilt is small as well. This small variation can be compensated in data processing if needed. Also note that for this example, working distance (WD) can be small (e.g., 800 mm). FIG. 4A also shows a corresponding shear distance as referred to object-space and demonstrates that substantial shear object-space shear distances can be produced with minimal variation in carrier frequency.

Example 5

Figures 5, 5A:
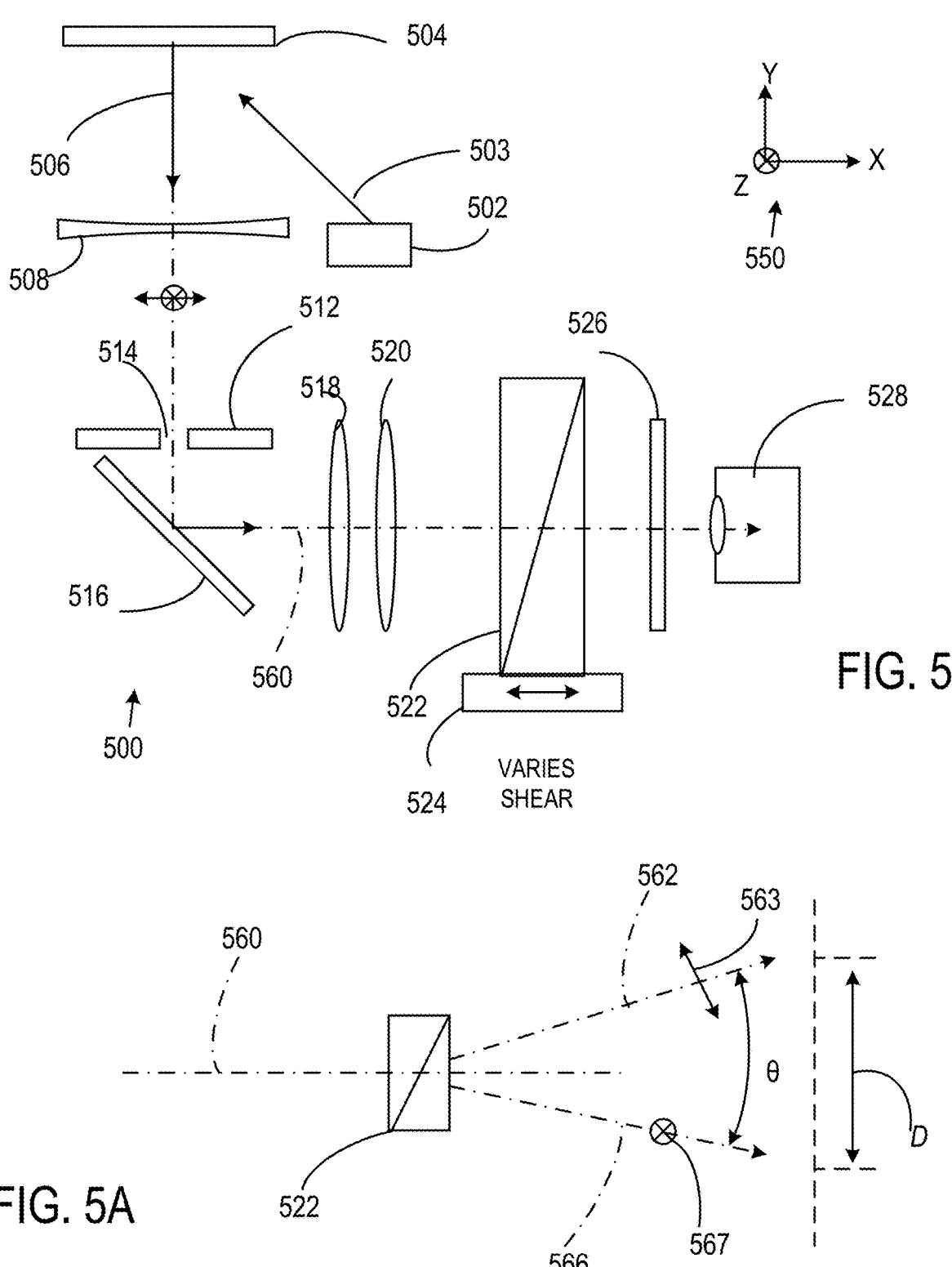
FIGS. 5-5A illustrate a representative shearography system that includes a Wollaston prism to variably select shear magnitude and a fixed fringe frequency.

Referring to FIG. 5, a shearography system 500 includes a source 502 that directs an optical beam 503 to a test object 504. Portions 506 of the optical beam 503 from the test object 504 are directed to a diverging lens 508 to an aperture plate 512 that defines a slit 514 having a longer dimension in a Z-axis direction of a coordinate system 550. A reflector 516 directs beam portions from the slit 514 to positive lenses 518, 520 that the beam along an axis 568 so that the test object is imaged at a camera 528. A Wollaston prism 522 receives the beam from the lens 520 and is situated on a translation stage 524 that is operable to move the Wollaston prism 522 towards or away from the camera 528 along the Y-axis of the coordinate system 550.

Referring to FIG. 5A, the beam is directed to the Wollaston prism 522 along the axis 560 and the Wollaston prism produces divergent axes 562, 566 associated with SOPs indicated at 563, 567. The divergence angle θ is fixed by the Wollaston prism 522 and the beam wavelength and determines the fringe carrier frequency at the camera 528 along with any focus elements at the camera. A shear magnitude (corresponding to distance D) can be varied from nearly zero by situating the Wollaston prism 522 at the camera 528 while producing larger shear magnitudes by moving the Wollaston prism 522 away from the camera 528. The shearography system 500 thus provides a fixed fringe carrier frequency but has variable shear magnitude. In contrast to the examples of FIGS. 2-3 in which beam offsets are provided at or near a pupil plane, the shearography system 500 can produces angular divergence at or near an image plane.

The focusing beam includes beam portions associated with orthogonal SOPs that are separated by the Wollaston prism 522 and exit the Wollaston prism with a divergence angle determined by a prism wedge angle (and beam wavelength). The shearography system 500 thus provides a fixed fringe carrier frequency but has variable shear magnitude. In contrast to the examples of FIGS. 2-3 in which beam offsets are provided at or near a pupil plane, the shearography system 500 produces shear using an angular divergence and varying a distance to an image plane.

Example 6

Figure 5B:
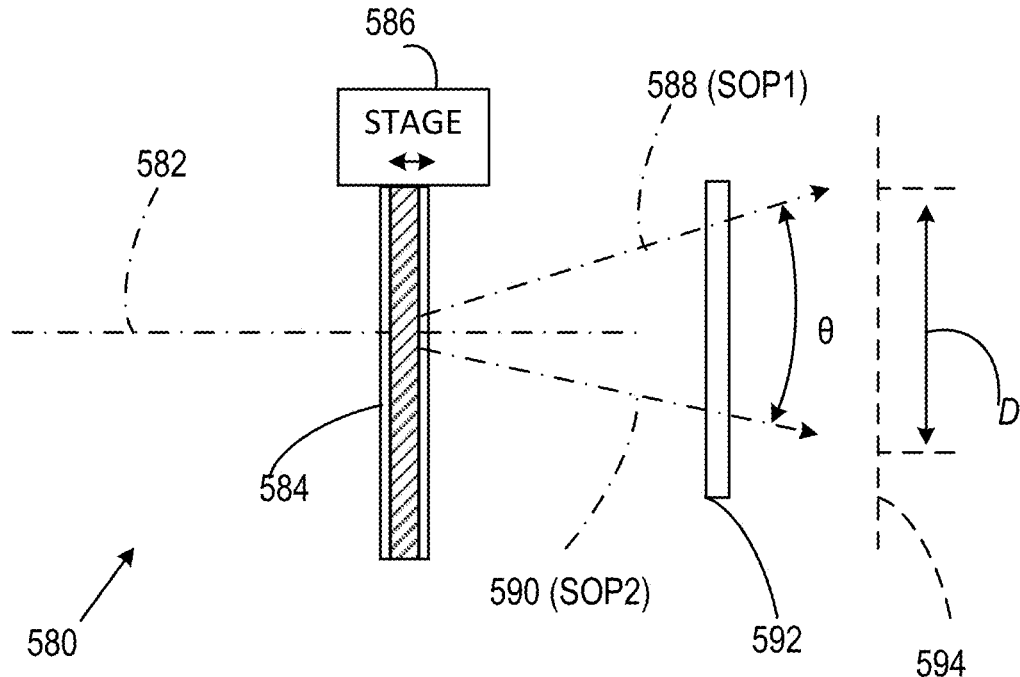
FIG. 5B illustrates use of a polarization grating to replace the Wollaston prism shown in FIGS. 5-5A.

The example of FIGS. 5-5A uses a Wollaston prism but other components can be used to produce beam shear and set fringe frequency. Referring to FIG. 5B, a beam from a test object is directed along an axis 582 to a polarization grating 584 that is movable along the axis 582 with a stage 586. The PG 584 produces divergent axes 588, 590 along which beams in a first state of polarization (SOP1) and a second state of polarization (SOP2) propagate, SOP1 and SOP2 are typically right- and left-handed circular SOPs (RHC, LHC, respectively). The divergence angle θ is fixed and is determined by diffraction orders of the PG 584. The PG 584 determines the fringe carrier frequency along with elements associated with image formation, typically one or more lenses. A shear magnitude can be varied from nearly zero by situating the PG 584 at an image sensor input plane 594 and producing larger shear magnitudes by moving the PG 584 away from the image sensor plane 594. Because SOP1 and SOP2 are generally orthogonal, both beams are directed to polarizer 592 to produce interference at the image sensor.

Example 7

Figure 6A:
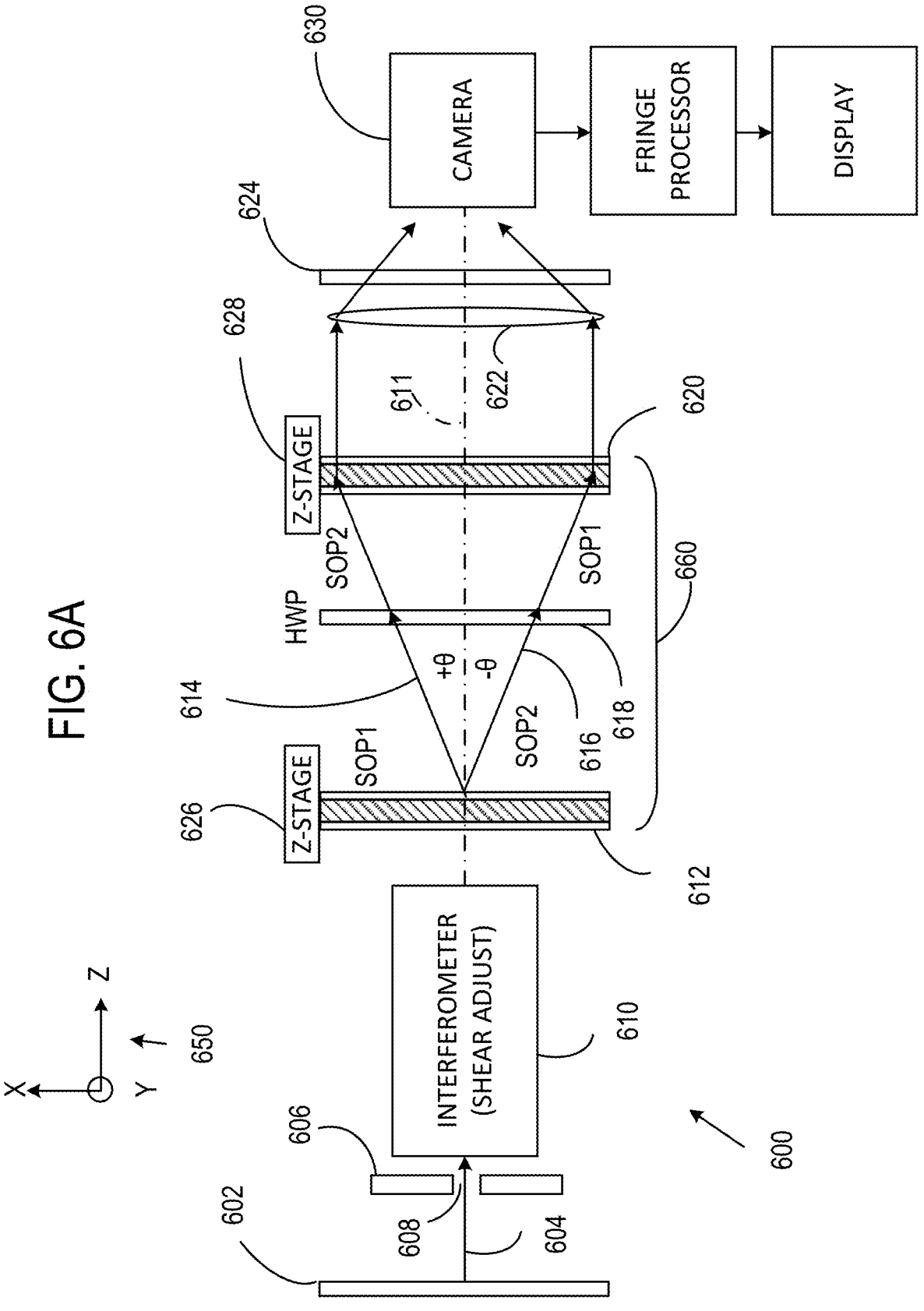
FIGS. 6A-6B illustrate shearography systems that include polarization gratings.

Referring to FIG. 6A a representative shearography system 600 includes a laser that delivers an optical beam to a test part 602. A beam portion 604 of the optical beam that is scattered or reflected from the test part 602 is received at an aperture plate 606 that defines an elongated aperture 608 that has a larger extent in a Y-direction than in an X-direction in a coordinate system 650. The aperture plate 606 is generally situated at or near an interferometer 610 that can provide a shear magnitude adjustment. The interferometer 610 is preferably situated at or near a pupil of an optical system used to produce fringes in order to reduce or minimize changes in fringe carrier frequency associated with shear magnitude adjustments. The beam portion 604 is directed from the interferometer 610 along an axis 611 to a carrier frequency optical system 660 that includes a first polarization grating (PG) 612, a halfwave plate 618, and a second PG 620. The first PG 612 diffracts orthogonal polarization components SOP1 and SOP2 into respective beams 614, 616, wherein SOP1 and SOP2 are typically circular SOPs. The PG 612 generally diffracts the orthogonal SOPs at angles +0 and −0 associated with a first diffraction orders, with little or no diffraction into other orders. The beams 614, 616 are directed to the halfwave plate 618 which interchanges the SOPs of the beams 614, 616 so that the output SOPs are SOP2, SOP1, respectively. For example, if the beam 614 has a right-handed circular SOP as produced by the PG 612, after interacting with the halfwave plate 618, the beam 614 has a left-handed circular SOP. At the PG 620, the beams 614, 616 are diffracted to propagate parallel to the axis 611 and to a lens 622 which directs the beams 614, 616 to a camera 630. A polarizer 624 is provided to project SOP1 and SOP2 into a common SOP to produce interference at the camera 630.

In the system 600, one or both of the PGs 612, 620 can be provided with respective Z-axis translation stages 626, 628 to vary fringe carrier frequency if desired. As illustrated, the carrier frequency optical system 660 can serve the same function as the MSP 260 of FIG. 2 but can also provide carrier frequency adjustment. In this example, variations in carrier frequency introduced by the interferometer 610 in adjusting shear magnitude can be compensated at the carrier frequency optical system 660.

Example 8

Figure 6B:
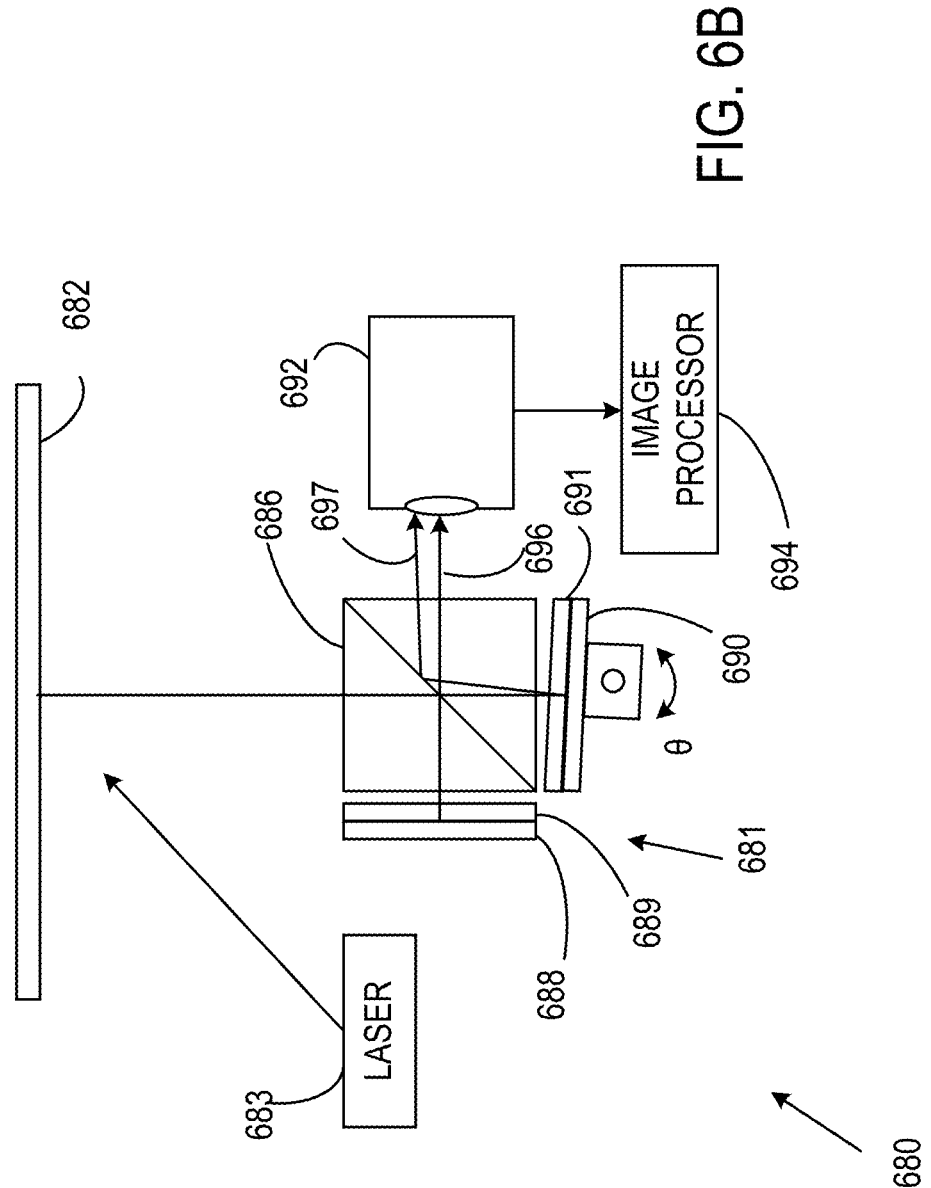

Referring to FIG. 6B, a representative shearography system 680 includes a laser 683 that that directs a beam to a test part 682 and an interferometer 681 that is based on a polarizing beam splitter (PBS) 686, reflectors 688, 690 and associated quarter-wave plates 689, 691. As shown, the reflector 690 is tiltable and a camera 692 is situated to receive two images of a speckle field associated with propagation directions 696, 697. A detected fringe pattern is then coupled to a processor 694. In this example shear magnitude is variable with rotation of the reflector 690 and this rotation also changes fringe frequency. Use of a PBS can provide efficient use of optical power from the laser 683.

Example 9

Figure 7:
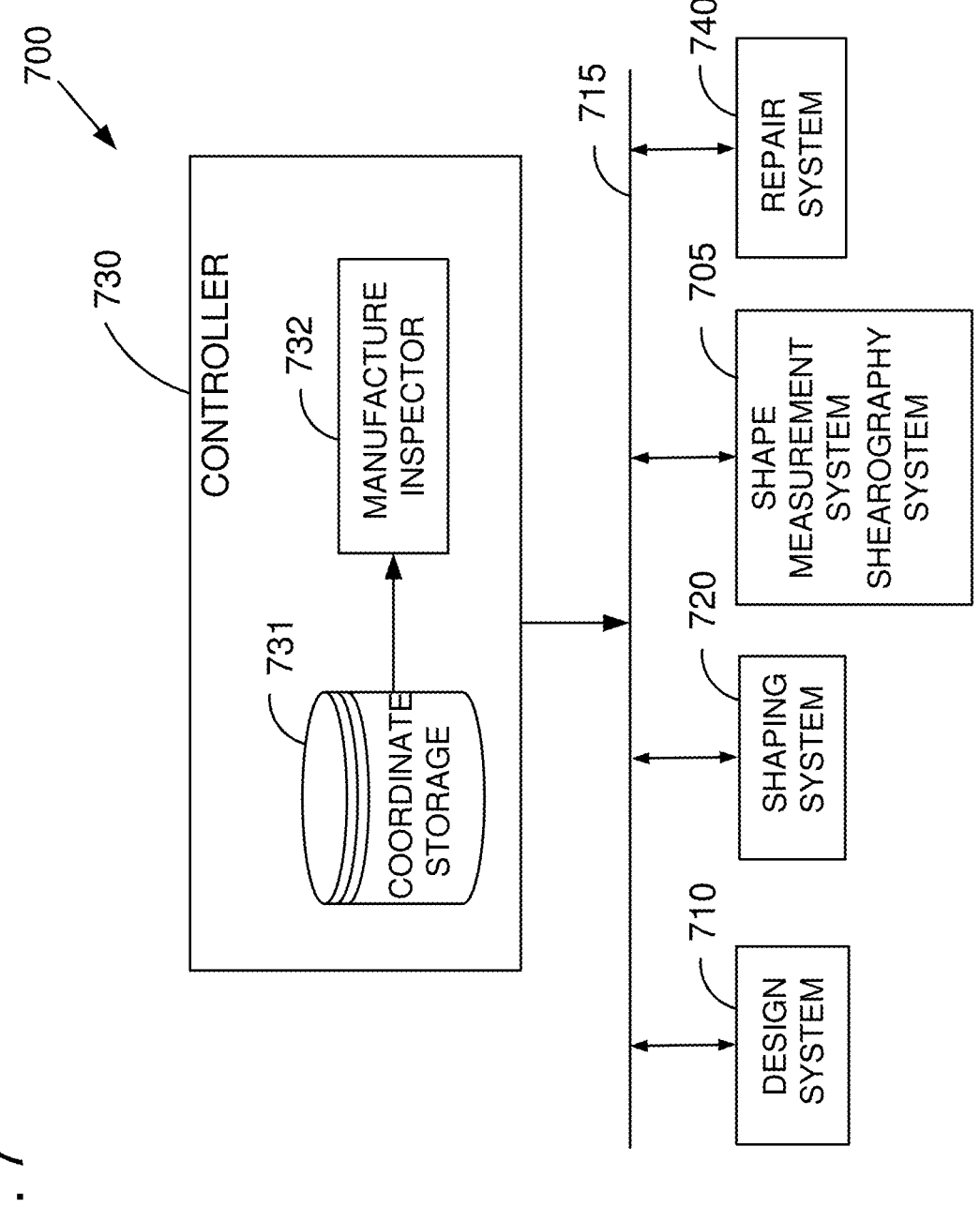
FIG. 7 is a block diagram of a representative manufacturing system that includes a shearography system to assess whether manufactured parts are defective or acceptable.

FIG. 7 illustrates a representative manufacturing system 700 suitable for producing one or more components of a ship, airplane, or part of other systems or apparatus, and for evaluating and reprocessing such manufactured components. The system 700 typically includes a shape measurement system 705 such as a shearography system as discussed above that can provide measurements of changes in shape. The manufacturing system 700 also includes a design system 710, a shaping system 720, a controller 730, and a repair system 740. The controller 730 includes coordinate storage 731 configured to store measured and design coordinates or other characteristics of one or more manufactured structures as designed and/or measured. The coordinate storage 731 is generally a computer readable medium such as hard disk, random access memory, or other memory device. Typically, the design system 710, the shaping system 720, the shape measurement system 705, and a repair system 740 communicate via a communication bus 715 using a network protocol.

The design system 710 is configured to create design information corresponding to shape, coordinates, dimensions, or other features of a structure to be manufactured, and to communicate the created design information to the shaping system 720. In addition, the design system 710 can communicate design information to the coordinate storage 731 of the controller 730 for storage. Design information typically includes information indicating the coordinates of some or all features of a structure to be produced.

The shaping system 720 is configured to produce a structure based on the design information provided by the design system 710. The shaping processes provided by the shaping system 720 can include casting, forging, cutting, or other process. The shape measurement system 705 is configured to measure one or more features of the manufactured structure or changes in such features and communicate the information to the controller 730.

A manufacture inspector 732 of the controller 730 is configured to obtain design information from the coordinate storage 731, and compare information received from the shearography system with design information read out from the coordinate storage 731. The manufacture inspector 732 is generally provided as a processor and a series of computer-executable instructions that are stored in a tangible computer readable medium such as random-access memory, a flash drive, a hard disk, or other physical devices. Based on the comparison of design and actual structure data, the manufacture inspector 732 can determine whether the manufacture structure is shaped in accordance with the design information, generally based on one or more design tolerances that can also be stored in the coordinate storage 731. In other words, the manufacture inspector 732 can determine whether the manufactured structure is defective or nondefective. When the structure is not shaped in accordance with the design information (and is defective), then the manufacture inspector 732 determines whether the structure is repairable. If repairable, then the manufacture inspector 732 can identify defective portions of the manufactured structure and provide suitable coordinates or other repair data. The manufacture inspector 732 is configured to produce one or more repair instructions or repair data and forward repair instructions and repair data to the repair system 740. Such repair data can include locations requiring repair, the extent of re-shaping required, or other repair data. The repair system 740 is configured to process defective portions of the manufactured structure based on the repair data.

Examples of the shaping system 720 described above include an additive manufacturing apparatus, a subtractive apparatus, and the like. The additive manufacturing apparatus may be, for example, the apparatus disclosed in United States Patent Application Publication Nos. 2021/0220948A1, 2021/0178521A1, 2021/0170692, 2021/0001403, and 2021/0023779. The subtractive apparatus may be, for example, the apparatus disclosed in United States Patent Application Publication Nos. 2021/0339359, 2021/0069847, and 2021/0370444. The disclosures of all of the above patent application publications are incorporated herein by reference.

Example 10

Figure 8:
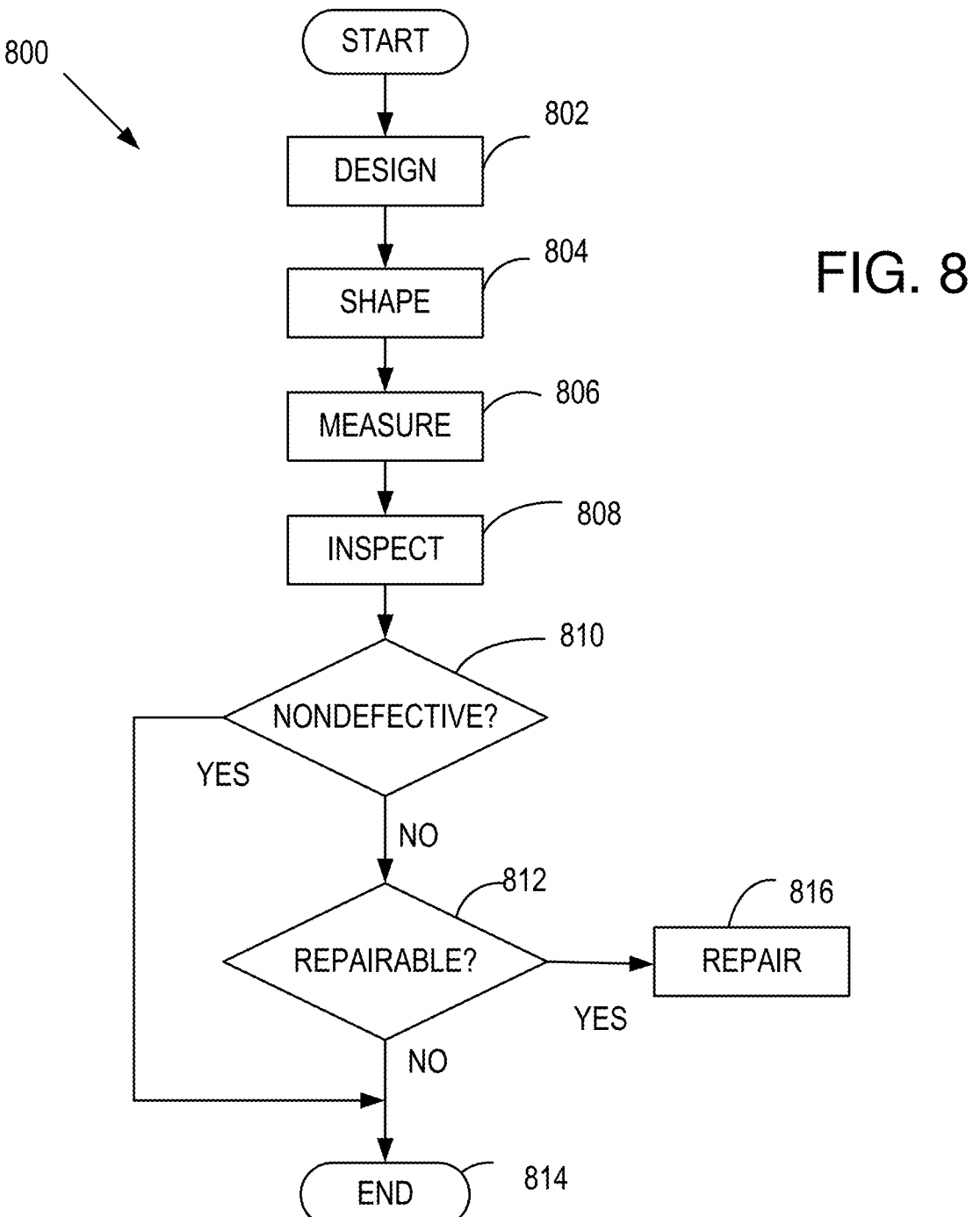
FIG. 8 is a block diagram illustrating a representative manufacturing method that includes profile measurement to determine whether manufactured structures or components are acceptable, and if one or more such manufactured structures can be repaired.

FIG. 8 is a flowchart showing a representative manufacture method 800 that can incorporate manufacturing systems such as illustrated in FIG. 7. At 802, design information is obtained or created corresponding to a shape of a structure to be manufactured. At 804, the structure is manufactured or "shaped" based on the design information. At 806, features of the manufactured structure are measured with a shearography system. At 808, the manufactured structure is inspected based on a comparison of actual and design dimensions, coordinates, manufacturing tolerance, or other structure parameters. At 810, if the manufactured structure is determined to be nondefective, the manufactured part is accepted, and processing ends at 814. If the manufacture part is determined to be defective at 810 by, for example, the manufacture inspector 732 of the controller 730 as shown in FIG. 7, then at 812 it can be determined whether the manufacture part is repairable. If repairable, the manufactured part is reprocessed or repaired at 816, and then measured, inspected, and reevaluated at 806, 808, 810, respectively. If the manufactured part is determined to be unrepairable at 812, the process ends at 814.

According to the method of FIG. 8, using a shearography system to measure or assess features of a manufactured structure, a manufactured structure can be evaluated to determine if the structure is defective or nondefective. Further, if a manufactured structure is determined to be defective, a reprocessing process can be initiated if the part is deemed to be repairable based on design and actual structure dimensions and features. By repeating the measurement, inspection, and evaluation processes, defective parts can be reprocessed, and parts that are defective but that are not repairable can be discarded. The particular systems and methods of FIGS. 7-8 are exemplary only, and other arrangements can be used.

Representative Embodiments

Embodiment 1 is a shearography system, including: a shearing optic operable to provide a variable shear between a first image and a second image of a test object, wherein the first image and the second image are speckle images; a detector; and an optical system operable to direct the variably sheared first image and second image to the detector at respective angles to establish a substantially fixed fringe frequency associated with interference of the sheared first and second images.

Embodiment 2 includes the subject matter of Embodiment 1, and further specifies that the shearing optic is situated at a pupil of the optical system.

Embodiment 3 includes the subject matter of any of Embodiments 1-2, and further specifies that the shearing optic is an interferometer.

Embodiment 4 includes the subject matter of any of Embodiments 1-3, and further specifies that the interferometer includes a beam splitter (BS) situated to produce a first beam and a second beam associated with the first image and the second image and a first reflector and a second reflector situated to direct the first beam and the second beam, respectively, to the detector.

Embodiment 5 includes the subject matter of any of Embodiments 1-4, and further includes a rotational actuator coupled to rotate the first reflector or the second reflector, wherein a shear magnitude is adjustable with the rotation.

Embodiment 6 includes the subject matter of any of Embodiments 1-5, and further specifies that the beam splitter is a polarizing beam splitter (PBS) and the first and second reflectors are quarter-wave reflectors and the first beam and second beam are directed towards the detector in a first state of polarization (SOP) and a second SOP, respectively.

Embodiment 7 includes the subject matter of any of Embodiments 1-6, and further includes a polarizer situated between the PBS and the detector and operable to transmit at least portions of the first beam and the second beam.

Embodiment 8 includes the subject matter of any of Embodiments 1-7, and further specifies that the optical system includes a modified Savart plate (MSP) situated between the PBS and the detector, wherein the fringe frequency is based at least in part on a displacement of the first beam and the second beam produced with the MSP.

Embodiment 9 includes the subject matter of any of Embodiments 1-8, and further specifies that the optical system includes a modified Savart plate (MSP) situated between the shearing optic and the detector, wherein the fringe frequency is based at least in part on a displacement of the first beam and the second beam produced with the MSP.

Embodiment 10 includes the subject matter of any of Embodiments 1-9, and further specifies that the optical system includes at least one lens situated to produce the first image and the second image and the fringe frequency is established at least in part based on the at least one lens.

Embodiment 11 includes the subject matter of any of Embodiments 1-10, and further specifies that the shearing optic is a Wollaston prism that is translatable to provide a variable shear magnitude between the first image and the second image of the test object, and wherein the variable shear magnitude is based on a separation of the Wollaston prism and the detector.

Embodiment 12 includes the subject matter of any of Embodiments 1-11, and further specifies that the Wollaston prism defines a divergence angle between SOPs associated with the first image and the second image, and the fringe frequency is determined by the divergence angle.

Embodiment 13 includes the subject matter of any of Embodiments 1-12, and further includes a translation stage coupled to translate the Wollaston prism to select the variable shear magnitude.

Embodiment 14 includes the subject matter of any of Embodiments 1-13, and further specifies that the shearing optic is a polarizing grating (PG) that is translatable to provide a variable shear magnitude between the first image and the second image of the test object and the variable shear magnitude is based on a separation of the PG and the detector.

Embodiment 15 includes the subject matter of any of Embodiments 11-14, and further includes a translation stage coupled to translate the PG to select the variable shear magnitude.

Embodiment 16 is a shearography system, including: a detector; and an optical system operable to vary a shear between a first image and a second image of a test object independently of a fringe frequency produced by interference of beams associated with the first image and the second image at the detector, wherein the first image and the second image are speckle images.

Embodiment 17 includes the subject matter of Embodiment 16, and further specifies that the optical system includes a Wollaston prism that at least partially establishes the substantially fixed fringe frequency and is translatable to vary the shear.

Embodiment 18 includes the subject matter of any of Embodiments 16-17 and further specifies that the optical system includes an interferometer that is adjustable to vary the shear and a modified Savart plate (MSP) that establishes the fixed fringe frequency.

Embodiment 19 includes the subject matter of any of Embodiments 16-18, and further specifies that the MSP is a symmetric MSP.

Embodiment 20 includes the subject matter of any of Embodiments 16-19, and further specifies that the optical system includes imaging optics situated to produce the first image and the second image, wherein the interferometer is situated proximate a pupil of the imaging optics.

Embodiment 21 includes the subject matter of any of Embodiments 16-20, and further specifies that the optical system includes an interferometer that is adjustable to vary the shear, an imaging optical system situated to produce the first image and the second image, wherein the interferometer is situated proximate a pupil of the optical system, and pair of polarization gratings with a halfwave plate situated between the polarization gratings, wherein the fringe frequency is based in part on separation of the first polarization grating and the second polarization grating.

Embodiment 22 is a shearography method, including: situating a shear optic at a pupil of an imaging system to variably establish a shear; and interfering sheared first and second images produced with the imaging system to produce a fringe frequency that is independent of the variably established shear.

Embodiment 23 includes the subject matter of Embodiment 22, and further specifies that variably establishing the shear comprises dividing an optical beam from a test object into first and second optical beams corresponding to the first and second images and adjusting a tilt angle between the first and second optical beams.

Embodiment 24 is a shearography method, including: with a shearing optic, dividing an optical beam from a test object into first and second optical beams corresponding to first and second images; adjusting a shear between the first and second images by varying a separation of the shearing optic and an image sensor; and detecting an interference of the first and second images at the image sensor.

Embodiment 25 includes the subject matter of Embodiment 24, and further specifies that the shearing optic is a polarization grating or a Wollaston prism.

Embodiment 26 is a metrology instrument that measures an object based on shearography, including: a polarizing beam splitter (PBS) situated to divide an optical beam from an object into a first polarized beam and a second polarized beam, wherein a state of polarization (SOP) of the second polarized beam is different from an SOP of the of the first polarized beam; a shearing optic situated to laterally shift the first polarized beam and the second polarized beam from the PBS with respect to each other; an imaging system situated to produce a first image and a second image corresponding to the first polarized beam and the second polarized beam, respectively; and a detector situated to detect an interference of the first image and the second image, wherein the shearing optic is situated proximate a pupil of the imaging system.

Embodiment 27 includes the subject matter of Embodiment 26, and further specifies that the shearing optic is a reflector situated to produce the lateral shift based on a reflector tilt.

In view of the many possible embodiments to which the principles of the disclosed technology may be applied, it should be recognized that the illustrated embodiments are only preferred examples.

We claim:

1. A shearography system, comprising:
   a shearing optic operable to provide a variable shear between a first image and a second image of a test object, wherein the first image and the second image are speckle images;
   a detector; and
   an optical system operable to direct the variably sheared first image and second image to the detector at respective angles to establish a substantially fixed fringe frequency associated with interference of the variably sheared first and second images.

2. The shearography system of claim 1, wherein the shearing optic is situated at a pupil of the optical system.

3. The shearography system of claim 1, wherein the shearing optic is an interferometer.

4. The shearography system of claim 3, wherein the interferometer includes a beam splitter situated to produce a first beam and a second beam associated with the first image and the second image and a first reflector and a second reflector situated to direct the first beam and the second beam, respectively, to the detector.

5. The shearography system of claim 4, further comprising a rotational actuator coupled to rotate the first reflector or the second reflector, wherein a shear magnitude is adjustable with the rotation.

6. The shearography system of claim 5, wherein the beam splitter is a polarizing beam splitter and the first and second reflectors are quarter-wave reflectors and the first beam and second beam are directed towards the detector in a first state of polarization and a second state of polarization, respectively.

7. The shearography system of claim 6, further comprising a polarizer situated between the polarizing beam splitter and the detector and operable to transmit at least portions of the first beam and the second beam.

8. The shearography system of claim 7, wherein the optical system includes a modified Savart plate situated between the polarizing beam splitter and the detector, wherein the substantially fixed fringe frequency is based at least in part on a displacement of the first beam and the second beam produced with the modified Savart plate.

9. The shearography system of claim 1, wherein the optical system includes a modified Savart plate situated between the shearing optic and the detector, wherein the substantially fixed fringe frequency is based at least in part on a displacement of a first beam and a second beam produced with the modified Savart plate.

10. The shearography system of claim 1, wherein the optical system includes at least one lens situated to produce the first image and the second image and the substantially fixed fringe frequency is established at least in part based on the at least one lens.

11. The shearography system of claim 1, wherein the shearing optic is a Wollaston prism that is translatable to provide a variable shear magnitude between the first image and the second image of the test object, and wherein the variable shear magnitude is based on a separation of the Wollaston prism and the detector.

12. The shearography system of claim 11, wherein the Wollaston prism defines a divergence angle between states of polarization associated with the first image and the second image, and the fringe frequency is determined by the divergence angle.

13. The shearography system of claim 12, further comprising a translation stage coupled to translate the Wollaston prism to select the variable shear magnitude.

14. The shearography system of claim 11, further comprising a translation stage coupled to translate a polarizing grating to select the variable shear magnitude.

15. The shearography system of claim 1, wherein the shearing optic is a polarizing grating that is translatable to provide a variable shear magnitude between the first image and the second image of the test object and the variable shear magnitude is based on a separation of the polarizing grating and the detector.

16. A shearography system, comprising:
a detector; and
an optical system operable to vary a shear between a first image and a second image of a test object independently of a fringe frequency produced by interference of beams associated with the first image and the second image at the detector, wherein the first image and the second image are speckle images.

17. The shearography system of claim 16, wherein the optical system includes a Wollaston prism that at least partially establishes a substantially fixed fringe frequency and is translatable to vary the shear.

18. The shearography system of claim 16, wherein the optical system includes an interferometer that is adjustable to vary the shear and a modified Savart plate that establishes the fringe frequency as a fixed fringe frequency.

19. The shearography system of claim 18, wherein the modified Savart plate is a symmetric modified Savart plate.

20. The shearography system of claim 18, wherein the optical system includes imaging optics situated to produce the first image and the second image, wherein the interferometer is situated proximate a pupil of the imaging optics.

21. The shearography system of claim 16, wherein the optical system includes an interferometer that is adjustable to vary the shear, an imaging optical system situated to produce the first image and the second image, wherein the interferometer is situated proximate a pupil of the optical system, and pair of polarization gratings with a halfwave plate situated between the polarization gratings, wherein the fringe frequency is based in part on separation of a first polarization grating and a second polarization grating of the pair of polarization gratings.

22. A shearography method, comprising:
situating a shear optic at a pupil of an imaging system to variably establish a shear; and
interfering sheared first and second images produced with the imaging system to produce a fringe frequency that is independent of the variably established shear.

23. The shearography method of claim 22, wherein variably establishing the shear comprises dividing an optical beam from a test object into first and second optical beams corresponding to the first and second images and adjusting a tilt angle between the first and second optical beams.

24. A metrology instrument that measures an object based on shearography, comprising:
a polarizing beam splitter situated to divide an optical beam from an object into a first polarized beam and a second polarized beam, wherein a state of polarization of the second polarized beam is different from a state of polarization of the first polarized beam;
a shearing optic situated to laterally shift the first polarized beam and the second polarized beam from the polarizing beam splitter with respect to each other;
an imaging system situated to produce a first image and a second image corresponding to the first polarized beam and the second polarized beam, respectively; and
a detector situated to detect an interference of the first image and the second image, wherein the shearing optic is situated proximate a pupil of the imaging system.

25. The metrology instrument of claim 24, wherein the shearing optic is a reflector situated to produce the lateral shift based on a reflector tilt.

26. The metrology instrument of claim 24, wherein the shearing optic situated proximate a pupil of the imaging system to produces a fringe frequency that is independent of the variably established shear.

*    *    *    *    *